United States Patent Office 3,375,309
Patented Mar. 26, 1968

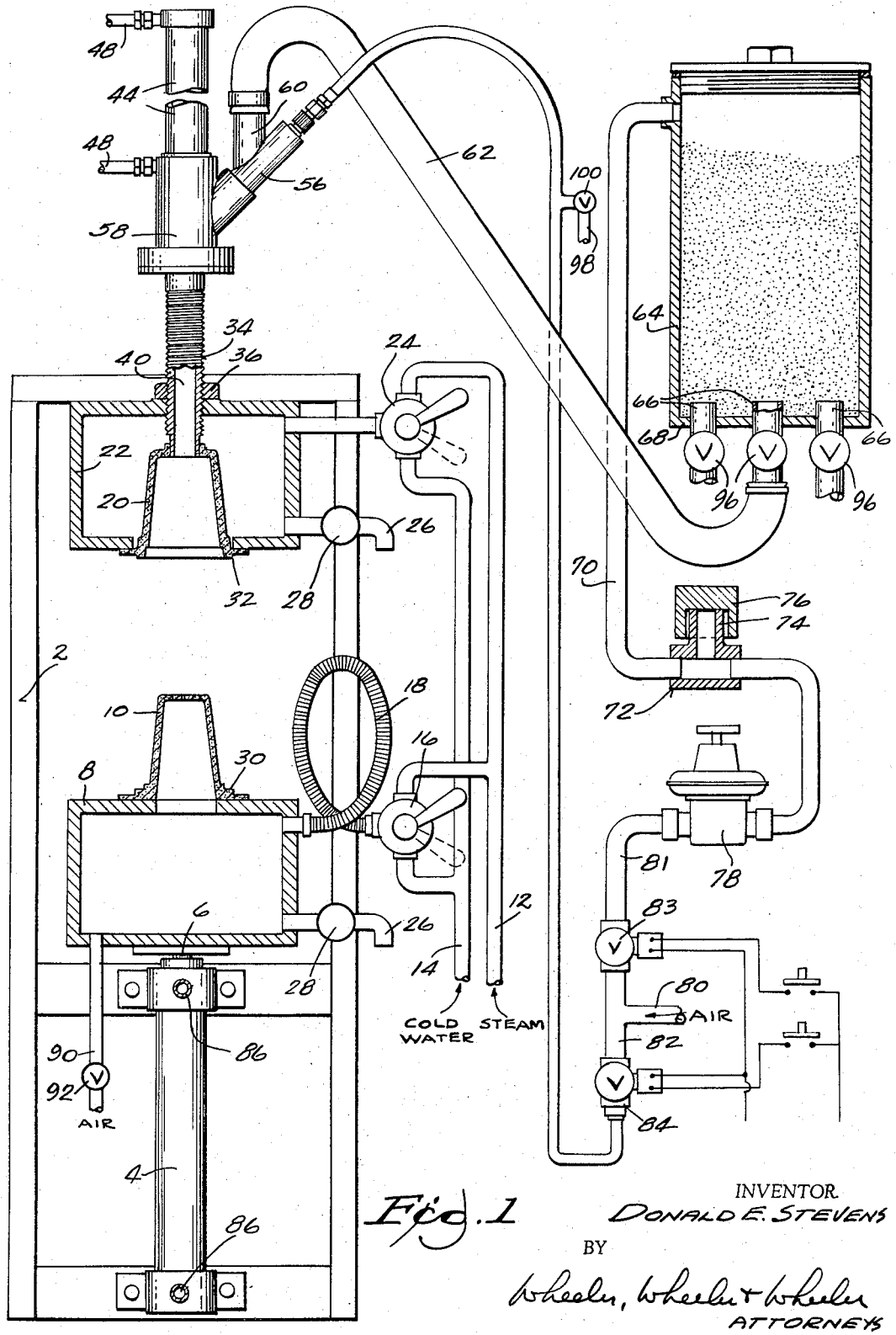

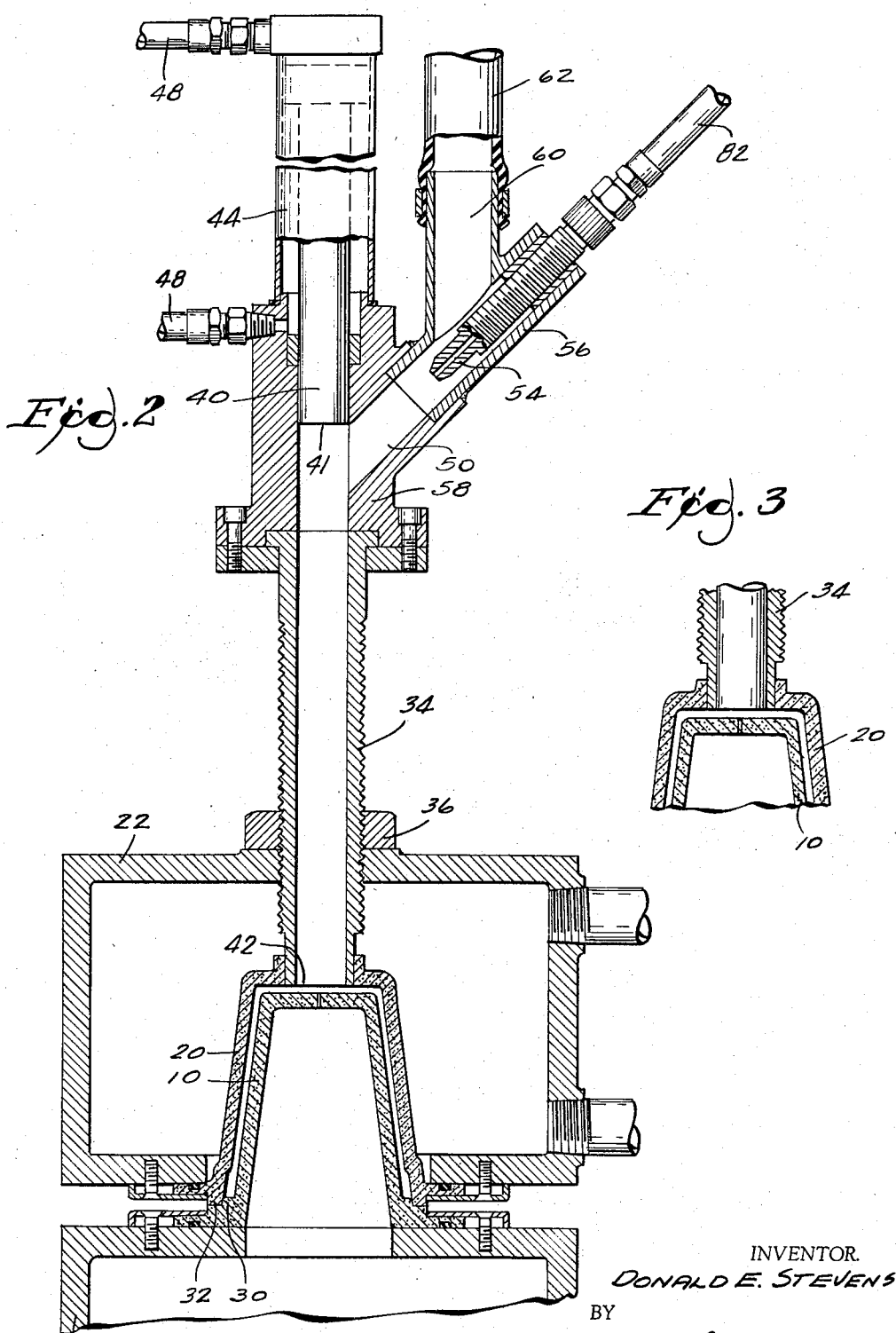

3,375,309
METHOD OF INTRODUCING PARTICULATE MOLDABLE MATERIAL INTO A CONFINED SPACE
Donald E. Stevens, Sheboygan Falls, Wis., assignor to Kohler General, Inc., a corporation of Wisconsin
Filed June 17, 1964, Ser. No. 375,699
6 Claims. (Cl. 264—121)

This invention relates to a molding apparatus and method.

In the molding of thin walled plastic products, such as cups, from particulate material such as partly cured polystyrene beads, there is a considerable problem in getting the material into the mold.

According to the present invention, the mold comprises male and female elements which are separable to permit of the removal of molded products but which, when assembled, are completely closed with the exception of a plug which is in place during the molding operation but is withdrawn temporarily to permit of the introduction of the molding material. The present invention results in very substantial savings in time and equipment by eliminating from prior art practices the metering of the material required to fill the mold; the flowing of the material freely by gravity into the mold, the valve-control of material feed; and the flow of air from one end of the mold to the other as a means of distributing the material therein.

According to the present invention, as soon as the female part of the mold is associated with the male or core part, the closure plunger being retracted, air pressure is momentarily applied through the pressure reducer to the top of the bead receptacle and, either concurrently or subsequently, to an aspirating fitting near the mold. Kinetic energy is imparted to the beads to cause them to move with considerable velocity toward the mold. When the air of the jet escapes back to the container it carries with it any surplus of material and the fluid is then discharged to atmosphefire through a relief valve. The particulate material in the container is desirably agitated in the course of air escape.

In practice, the amount of air pressure on the beads of the receptacle has been found to bear an important relationship to the rest of the apparatus. In the device shown, a relief valve set to open at a pressure of one pound per square inch determines the desired amount of pressure on the beads in the receptacle. A pressure of three pounds per square inch has been found to be excessive in this particular apparatus. It is important that the pressure in the receptacle shall not be so high that the excess of beads will be prevented from returning to the receptacle as herein described. Thus far, it has not been found possible to fill the mold adequately by using the aspirating valve unless some pressure is concurrently applied to the beads in the supply receptacle.

A very significant feature of the invention lies in the fact that the air which gave its kinetic energy to the material to impel it to the mold also entrains and returns to the container all surplus particles of material, thus making metering unnecessary. The mold is left precisely filled, with no excess. In one mode of operation, the beads are advanced toward the mold by the kinetic energy developed by sudden pressure on the beads in the receptacle, and the valve to the aspirating fitting is either opened immediately thereafter or is opened only when it becomes necessary to remove surplus beads from the mouth of the mold. In this mode of operation the aspirating gun is used primarily to return the excess beads to the container.

It is entirely immaterial to this operation whether or not the mold is porous. A perfectly solid mold can be used. In either case air will return with sufficient velocity at the mouth of the mold to entrain and return the surplus material, leaving the mold filled exactly to its mouth with no deficiency and no surplus.

As soon as the plunger advances to close the opening through which the material was introduced, the mold is heated and the material is expanded and fused to form the cup wall, whereupon the mold is chilled and opened to release the finished product, whereupon the operation is repeated.

In the drawings:

FIG. 1 is a diagrammatic view showing, partially in section and partially in side elevation, the component parts of apparatus embodying the invention.

FIG. 2 is an enlarged detail view in section showing the male and female components of the mold in operative engagement and the closure plunger retracted for the admission of molding material and the escape of the air which projected the material toward the mold.

FIG. 3 is a fragmentary detail view of the mold showing the closure plunger in place for the molding operation.

The frame 2 carries a ram 4, upon the plunger 6 on which is mounted a chamber 8 upon which the male or core member 10 of the mold is carried. A steam pipe 12 and a water pipe 14 lead to the valve 16. The valve has a flexible hose connection at 18 with the chamber 8 so that manipulation of the valve may either heat or cool the core member 10 and the workpiece molded thereon. Fixed at the top of the frame is the female mold member 20 which is carried in chamber 22 into which steam from pipe 12 or chilling fluid from pipe 14 may be admitted selectively subject to the control of the manually operable valve 24. Both the chamber 8 and chamber 22 are desirably provided with drain pipes 26 controlled by valves 28. At least the mold member 10 is desirably provided with pores or other openings (it may be sintered) so that steam and coolant admitted in turn to chamber 8 may actually flow through the mold and contact the work. This may also be true of female mold 20 and chamber 22.

The mold is closed by energizing the ram 4 to raise the chamber 8 toward the chamber 22, thereby causing the male mold member 10 to enter the female mold member 20. Complementary annular shouldered portions 30 and 32 of mold members 10 and 20 seat to provide a seal.

A sleeve 34 adjustably threaded in the chamber 22 and anchored by lock nut 36, as shown in FIG. 2, supports the external or female portion 20 of the mold and serves as a cylinder for closure plunger 40. The lower end 41 of this plunger serves as a retractable plug for the mold port 42 at the lower end of cylinder sleeve 34 which, in the lower position in which it is illustrated in FIGS. 1 and 3, has its plug end flush with the end of sleeve 34 and the interior of the female member 20 of the mold. The plunger 40 may be retracted by hydraulic fluid in the double-acting ram cylinder 44, communicated to the cylinder through pipe 48 subject to the usual control of a valve (not illustrated).

FIG. 2 shows plunger 40 retracted to uncover a branch conduit 50 leading to sleeve 34. Aligned with the branch conduit 50 is the air jet nozzle 54 mounted in an aspirating fitting 56 mounted on the fitting 58 at the lower end of the ram cylinder 44.

Leading into aspirating fitting 56 around nozzle 54 is a passage 60 connected by pipe 62 with the chamber 64 in which the particulate molding material is stored. In accordance with preferred practice, such material is hereinafter referred to as beads. It is important that the ends 66 of the several passages 62 leading to the molds should be elevated slightly above the bottom wall 68 of the supply reservoir 64 in which the beads are stored. The somewhat elevated location of the end portions 66 of pipes 62 in the bead reservoir 64 is significant because it tends to keep the beads from packing in, and bridging, the entrances to pipes 62 during the momentary aspiration of beads from the supply reservoir 64 when air valve 84 is opened.

A pipe 70 leads from the top of the bead reservoir 64 through a relief valve casing 72 which has a short stand pipe 74 on which the relief valve 76 is normally seated. This valve has the form of an inverted cup of predetermined weight. Its weight determines the amount of air pressure required to open the valve to permit air to escape from the stand pipe 74 with which duct 70 communicates.

The relief valve casing 72 communicates through a pressure reducing valve 78 with an air line 80 which has a branch 81 leading to the pressure reducer 78 subject to the control of valve 83 and another branch 82 controlled by valve 84 and leading to the aspirating nozzle 54. The valve 83 and valve 84 may be manually operated but, in the preferred practice of the invention, are opened concurrently and only momentarily and hence may conveniently be electrically or mechanically actuated. Solenoid valves are shown. The concurrent operation is diagrammatically illustrated by the line 85 which connects valve 83 and 84 in FIG. 1.

The operation is as follows:

The reducer may be set for a pressure below that which is required to open the relief valve 76 but if set for a higher pressure the excess escapes through the relief valve. Assuming, for example, that the relief valve opens at one pound per square inch, then air pressure of one pound per square inch is communicated from the air supply line 80 to the bead reservoir or storage chamber 64.

The mold being closed by operation of the ram 4 to engage the male member 10 and the female member 20 as shown in FIG. 2, the valves 83 and 84 are opened very briefly so that a momentary pressure impulse is applied to the beads in the receptacle and, simultaneously, a momentary jet of convection fluid (normally air) passes through the nozzle 54, entraining with it beads form reservoir 64. By way of example, I may use air at sixty pounds to eighty pounds pressure on line 80.

Either the pressure suddenly applied to the beads in receptacle 64 or the aspirating effect of the nozzle 54 in fitting 56, or both in sequence (or together), will impart kinetic energy to the beads for effecting movement of beads from the reservoir 64 toward the mold. In any case, the opening of the valves 83 and 84 is preferably only momentary, with the aspirating jet energized after the receptacle receives a slug of air.

Plunger 40 being elevated, as shown in FIG. 2, the beads are projected with considerable velocity through the cylinder 52 into the mold. Their kinetic energy distributes them and packs them into the mold between the male and female die parts 10 and 20. The air responsible for imparting kinetic energy thereto, does not substantially traverse the mold, and cannot traverse it at all if a solid mold is used in accordance with preferred practice, but develops back pressure and returns to the container, carrying with it any surplus of molding material.

Some small amount of air already in the mold will be trapped therein and a small part of the convection air current will unavoidably be carried with the beads into the mold. If the mold is porous, a part of such air may escape through the pores or other openings in the elements of the mold into the chambers for steam and coolant. Even if the mold is porous, it is at least substantially closed against air circulation and no substantial volume of air can circulate therethrough. Instead, back pressure is developed in the mold, and relieved as the convection fluid passes reversely through the pipe 62 to the bead storage reservoir 64.

The returning air carries with it from the mold entrance port 42 to the reservoir all excess of beads in the cylinder 52. There will not normally be any great excess because the time for which the valves 83 and 84 are open is carefully controlled to be only such time as is required to impart kinetic energy to approximately the requisite number of entrained beads for delivery into the mold. At the reservoir the beads are trapped and the convection fluid is discharged.

Because, in a closed system as herein described, it is desirable to control the pressure in the reservoir, it is desirable to have a pressure reducer communicating with the reservoir as shown. One of the interesting phenomena in connection with the device disclosed is the fact that the beads will not build up in the passage or cylinder 40 even if the valves 83 and 84 are left open continuously. Once the beads reach the top of the mold (the same would be true even if the passage were closed completely at its lower end) the effect of the aspirating jet subject to the control of valve 84 is to establish a current in the cylinder passage 40 which will completely remove all beads from that passage and return them via pipe 62 into the relatively low pressure reservoir 64.

In the reservoir, the air passes upwardly through the beads, aerating and loosening them, this being an important factor for keeping the beads in condition for successive operations. The air then escapes through pipe 70 and relief valve 76. The relief valve is preferably so designed either with a small slot or a screen as to pass the air but not the beads. Also, because the escaping air traverses the upper portion of the reservoir at low velocity above the level of the beads therein, it does not ordinarily carry beads with it through the relief valve.

Immediately after the supply of particulate molding material is delivered into the mold, and the surplus of such material has been removed, the ram 44 is actuated to advance plug plunger 40 to the mold-closing position in which it is illustrated in FIG. 3. All is now in readiness for the final curing of the initially particulate molding material between the mold elements 10 and 20. For this purpose, the valves 16 and 24 are thrown manually or otherwise to admit steam or other hot gasses from the line 12 to the chambers 8 and 22. In the case of a solid mold, the work is heated by conduction. In the case of a porous mold, the hot gases may pass through the porous mold parts 10 and 20 to some extent physically as well as by conduction to raise the material to curing temperature for expanding and fusing the work.

After a proper interval as determined by the nature of the work and the molding material, the valves 24 and 16 are thrown to shut off the steam and to admit coolant (gas or water) from line 14 to the respective chambers 8 and 22. Immediately the work is chilled and the coolant is cut off. When the mold is now opened by the admission of pressure through line 86 to ram cylinder 4, the work is preferably blown from the male element. In the case of a solid mold, a special air line may be provided conventionally for this purpose. In the case of a porous mold, the residual coolant pressure may be used to release the molded part from the sintered mold elements 10 and 20 or air pressure may be admitted through pipe 90 subject to the control of valve 92 so that the completed workpiece may readily be withdrawn. In one embodiment of the invention, each pipe 62 is provided with a shutoff valve at 96 and a separate air supply line 98 to the respective mold is controlled by valve 100. With shutoff valve 96 closed, valve 100 may be opened to admit air pressure through the aspirating fitting 56 to blow a workpiece from the female mold 20 without delivering a further charge of beads.

It will be understood, of course, that the showing is diagrammatic and the valves 16, 24, 83, 84 and 90 will, in the actual performance of this method normally be mechanically or electrically rather than manually actuated, the same being true of the valves (not shown) for controlling the rams 4 and 44.

Some of the features herein disclosed are suggested in my companion application Ser. No. 274,049, now Patent No. 3,264,381, filed April 18, 1963 and entitled Method of Manufacturing Low Density Products of Molded Synthetic Resin.

I claim:

1. A method introducing particulate moldable material into a confined space in an otherwise substantially closed mold for the molding of a workpiece, said method comprising the storage of particulate molding material at a point remote from the mold, the temporary establishment of superatmospheric pressure on the material in storage, the temporary establishment of a current of convection fluid toward the mold, the entrainment of particulate material in said current, the material receiving kinetic energy from the fluid of said current, the kinetic energy of the entrained material carrying it into the mold, developing back pressure of convection fluid in the mold and thereby arresting further flow of such fluid while the kinetic energy of the entrained material carries such material onward into the mold, the return of the convection fluid from the mold under the back pressure developed by such material in the mold, a reverse current of said fluid moving into particulate molding material which is still in storage, any excess of material at the mold being carried away from the mold by the return of the reversed current of said fluid, the trapping of the returned material in the material in storage, and the subsequent release of the returned convection fluid.

2. A method according to claim 1 including the further step of closing the mold, heating the mold for the curing of material already therein, chilling the mold and the workpiece molded therein, and opening the mold for the release of the workpiece.

3. A method according to claim 2 in which the chilling step includes the exposure of the mold to a cooling fluid, the opening of the mold, and the brief passing of fluid through a portion of the mold into direct contact with a workpiece for assisting in the displacement of the workpiece from the mold.

4. A method of introducing particulate moldable material from a reservoir through a conduit into a confined space in an otherwise substantially closed mold, said method comprising the kinetic projection of particulate molding material through the conduit toward the mold and establishing and moving concurrently therewith a momentary slug of convection fluid under superatmospheric pressure, accumulating some of said fluid and a substantial portion of such pressure in the substantially closed mold and thereby developing superatmospheric back pressure of said fluid which arrests further movement of convection fluid into the mold during continued kinetic movement of the molding material into the mold, and thereupon returning from said mold through the conduit to the reservoir convection fluid accumulated under superatmospheric pressure in the mold, and entraining with the returning convection fluid for return to the reservoir such portions of the molding material as remain in the conduit outside of the mold.

5. A method according to claim 4 in which kinetic energy is imparted to the particulate molding material by subjecting the material in the reservoir to momentary superatmospheric pressure and by delivering into said conduit a momentary aspirating jet of said convection fluid for accelerating flow of the molding material toward the mold.

6. A method according to claim 4 in which the molding material returned to the reservoir with the convection fluid from the mold is passed into the reservoir through other molding material in storage therein, and subsequently discharging from the reservoir, free of such material, the convection fluid returned thereto from the mold.

References Cited
UNITED STATES PATENTS

| | | | |
|---|---|---|---|
| 3,202,734 | 8/1965 | Young. | |
| 2,951,260 | 9/1960 | Harrison | 18—5 |
| 2,852,807 | 9/1958 | Altschuler | 18—5 |
| 2,610,138 | 9/1952 | Heritage | 264—121 |
| 2,649,394 | 8/1953 | Crewson | 264—121 |
| 3,099,045 | 7/1963 | Honkanen | 264—349 |
| 2,431,884 | 12/1947 | Neuschotz. | |

ROBERT F. WHITE, *Primary Examiner.*

R. B. MOFFITT, *Assistant Examiner.*